Feb. 27, 1934.   J. B. ARMITAGE   1,949,097
MACHINE TOOL TRANSMISSION AND CONTROL MECHANISM
Filed March 24, 1926   4 Sheets-Sheet 1
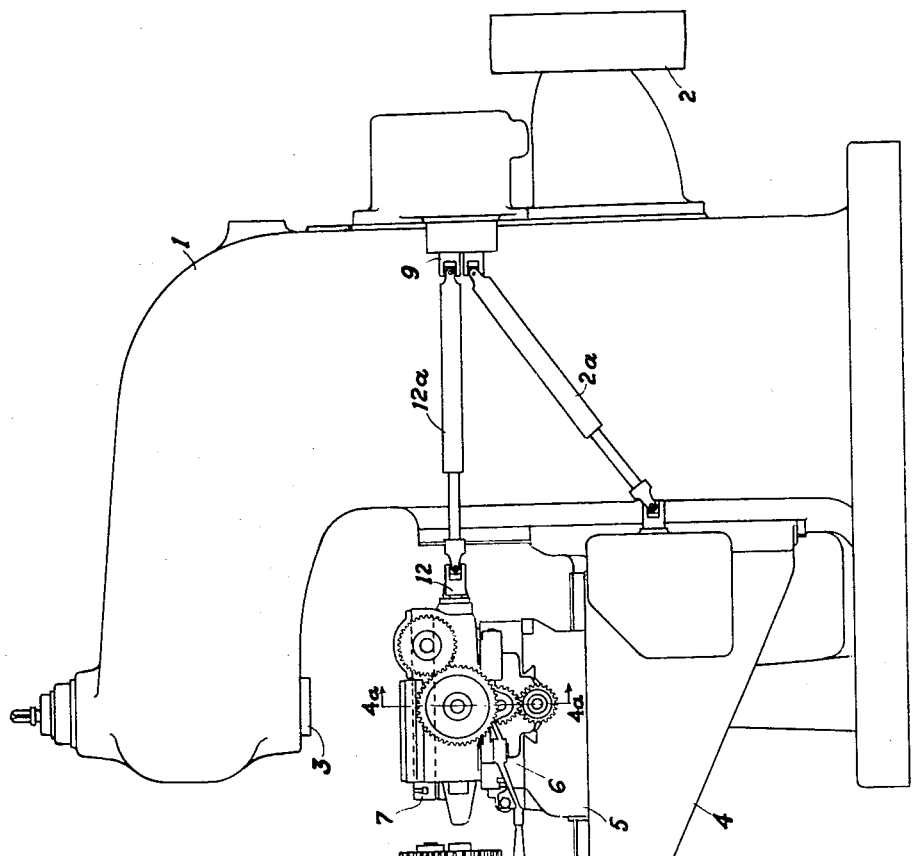
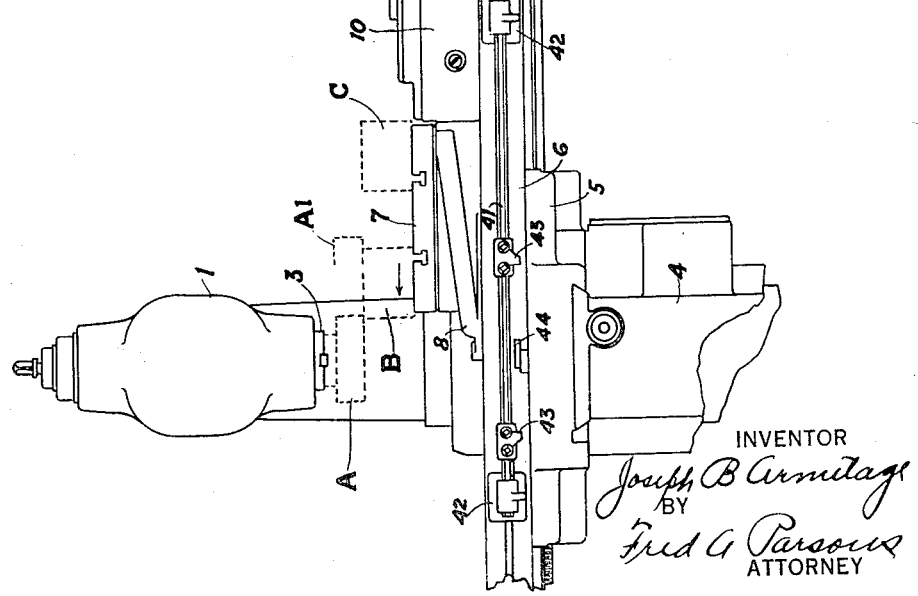
INVENTOR
Joseph B Armitage
BY
Fred G Parsons
ATTORNEY

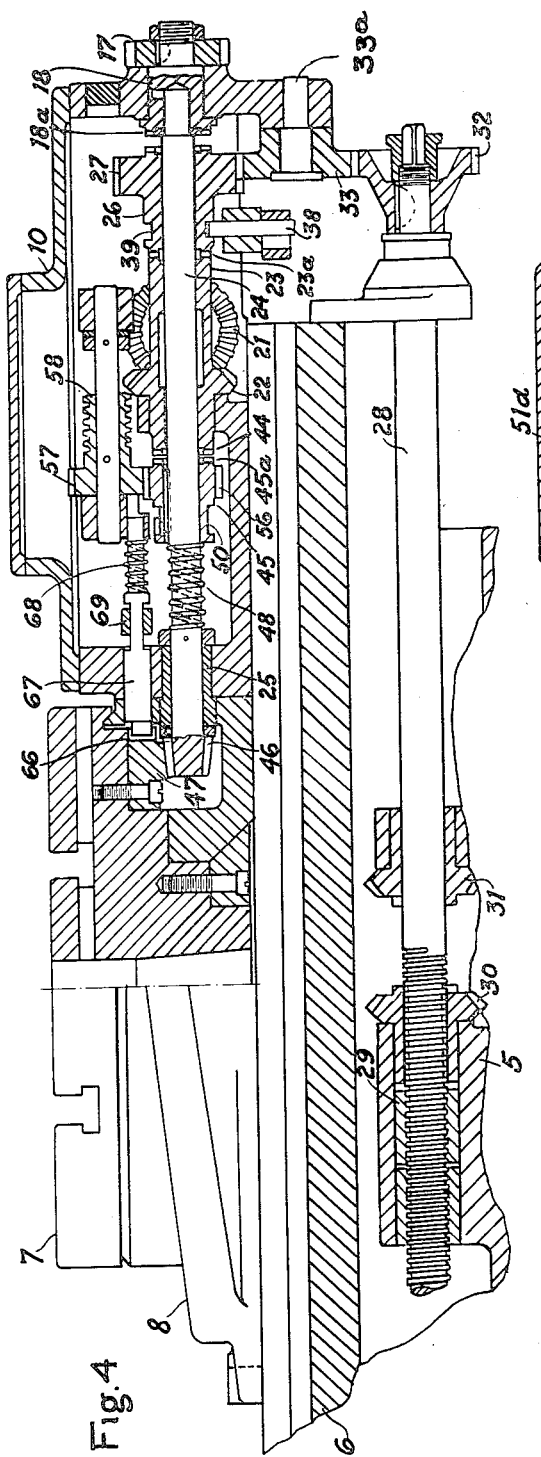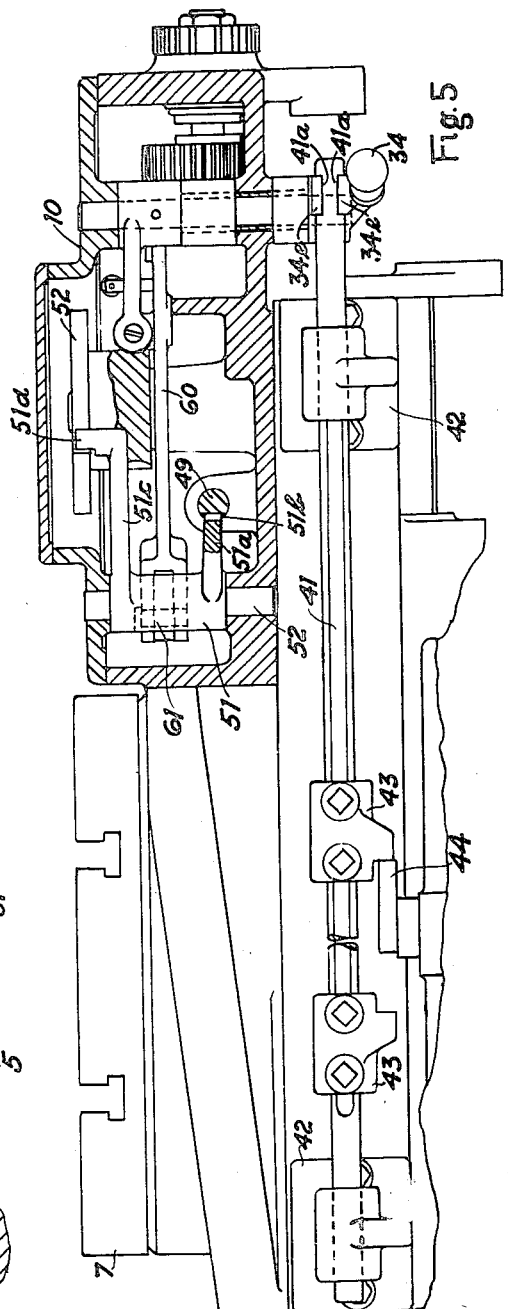

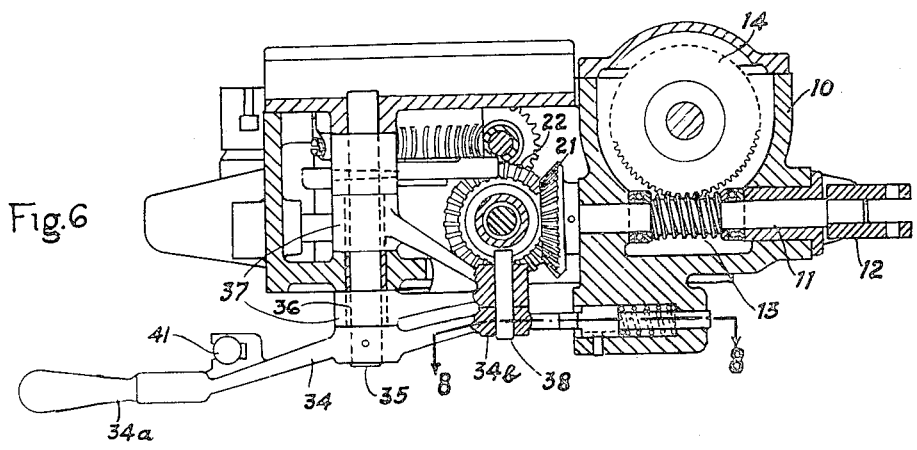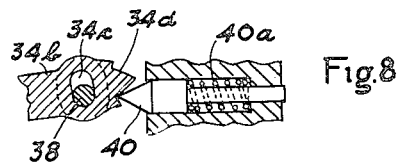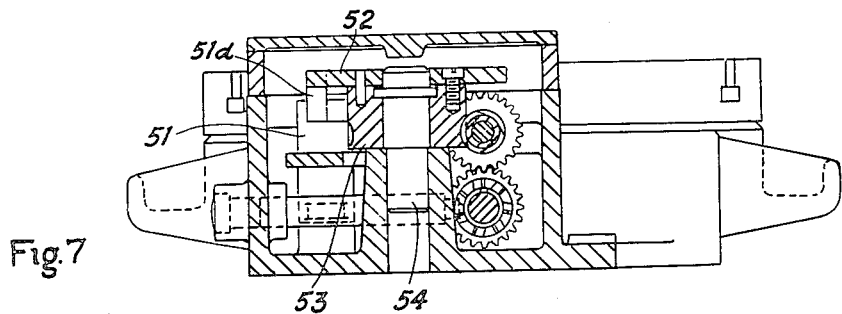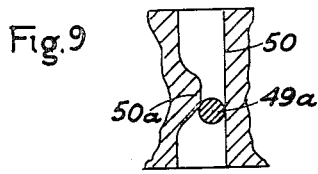

Patented Feb. 27, 1934

1,949,097

UNITED STATES PATENT OFFICE 1,949,097

MACHINE TOOL TRANSMISSION AND CONTROL MECHANISM

Joseph B. Armitage, Milwaukee, Wis., assignor to Kearney & Trecker Corporation, West Allis, Wis.

Application March 24, 1926. Serial No. 96,960

12 Claims. (Cl. 90—21)

This invention relates generally to transmission and control mechanism for machine tools.

An object is to provide a variety of relative movements between a work piece and a cutting tool and more particularly movements both of relative reciprocation and of rotary indexing.

A particular object is to provide suitable supports and transmission and control mechanism whereby a reciprocatory cutting stroke and a rotational indexing movement may be performed in timed relationship with a minimum of operative attention.

A further purpose is to provide means for relative work and tool movement in transverse paths or planes, one of the movements being reciprocatory and the other rotary.

A further purpose is to provide means for timed rotational and reciprocatory movement between a work piece and a cutting tool, the forward or cutting portion of the reciprocatory movement being at a relatively slow or feeding rate and the backward stroke being at a relatively rapid or quick traverse rate.

A further purpose is to provide means for tooling work pieces, in which the loading or unloading of the work pieces may be performed with maximum safety to the operator, at a point distant from the cutting tool.

A further purpose is to utilize for the accomplishment of the various objects of the invention and so far as may be possible the mechanism of a standard machine tool in which provision is made for ordinary tooling movements.

Another object is to provide mechanism for practically continuous milling of work pieces one after another, in a form which permits the relative feed movement of work and cutter to be in straight lines of travel and by means which permit a minimum number of special work holding devices to be used.

Another purpose is to provide a unitary attachment for convenient removal and replacement and enabling an ordinary milling machine to be quickly converted into a mechanism adapted for practically continuous milling of work pieces one after another with a minimum of operative attention and with a maximum of operative safety.

Another object is to improve and simplify the construction, organization and operation of the mechanism whereby the various purposes previously mentioned may be accomplished.

Still other objects will be apparent from this disclosure to those skilled in the art to which the present invention is directed.

In the accompanying drawings, the same reference characters have been used to designate the same parts in each of the several views, of which:

Fig. 1 shows a right hand view or elevation of a milling machine commonly known as a vertical spindle knee and column miller, in combination with an illustrative embodiment of my invention.

Fig. 2 is a front elevation of the same machine.

Fig. 4 is a front elevation, mainly in section along line 4—4 of Fig. 3, and along line 4a—4a of Fig. 1, showing the attachment and a portion of the machine table and drive.

Fig. 5 is a front elevation similar to Fig. 4, partly in section along line 5—5 of Fig. 3.

Fig. 6 is a sectional elevation along the line 6—6 of Fig. 3, viewed from the right.

Fig. 7 is a sectional elevation along line 7—7 of Fig. 3, viewed from the right.

Fig. 8 is a horizontal section of a portion of the mechanism along line 8—8 of Fig. 6.

Fig. 9 is a developed portion of a cam groove.

Figure 3:
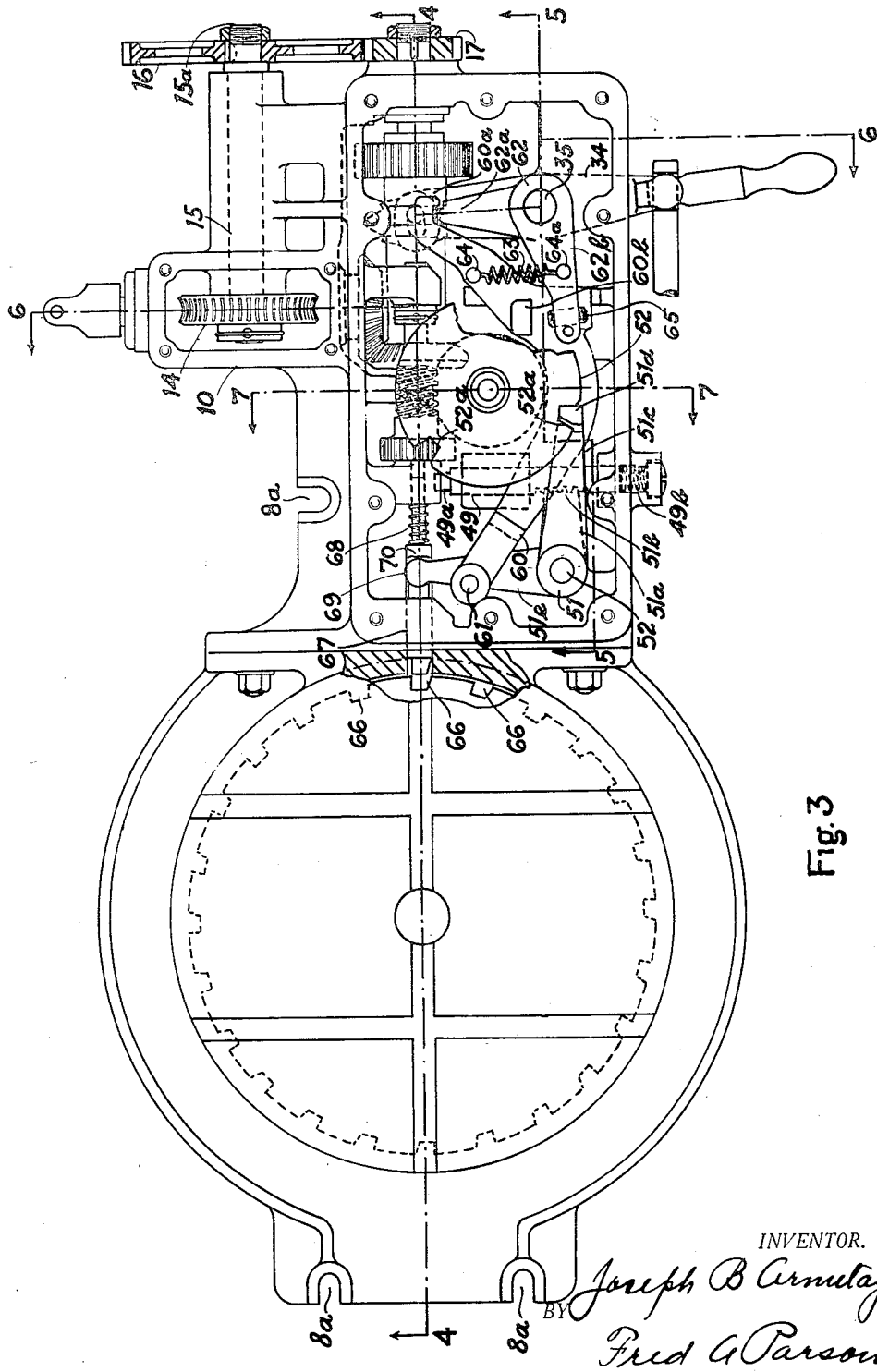
Fig. 3 is an enlarged plan view of the unitary attachment shown supported on the table of the machine in Figs. 1 and 2, with certain covers removed to expose the mechanism.

The milling machine shown includes a column or main support 1 supporting a rotatable drive pulley 2, a rotatable spindle or tool support 3 and a knee or support 4 guided for vertical reciprocatory movement on the front column face. Slidably guided from the top face of knee 4 is a saddle or support 5 reciprocable toward and from the column and slidably supported and guided for reciprocatory movement on the saddle is a table or support 6. The several supports provide relative movement between the spindle 3 and table 6 in three transverse paths. Spindle 3 is rotatable, and the knee, saddle and table are each movable from power derived from pulley 2 by the means of suitable transmission mechanism which includes a universal joint shaft generally denoted by the numeral 2a in Fig. 1 and which is well known in various forms and to the details of which constitute no part of the present invention.

An attachment table or work support 7 is rotatably mounted in a base 8 fixed on the machine table 6 by the means of suitable bolts (not shown) engaging with the table, and for which slots are provided in base 8 at several points as 8a.

A drive member 9 (Fig. 1) rotatably supported from the stationary column is connected to be rotatably actuated from pulley 2 by the means of any suitable transmission mechanism or may be actuated from any suitable power source, and forms a power source for actuating the rotary table 7. When the rotary table is to be reciprocated as well as rotated the member 9 is also connected to actuate the reciprocatory table 6, the normal drive thereto through the universal joint shaft 2a being at such times disconnected as will be later explained.

Fixed with the base 8 is a housing generally denoted by the numeral 10 in Figs. 2, etc., and fixed on a shaft 11 rotatably journaled therein is a drive member 12 (see Figs. 1 and 6) which is connected to be driven from the drive member 9 by the means of a universal joint shaft of well known construction denoted by the numeral 12a in Fig. 1.

Fixed upon or integral with shaft 11 is a worm 13 meshing with a worm wheel 14 fixed on a shaft 15 upon an end 15a of which is removably splined a gear 16 engaging with a gear 17 removably splined on a short shaft or member 18 rotatably supported in the housing 10. The member 18 is provided with clutch teeth 18a on its end face. The gears 16 and 17 form a gear pair, the individual gears of which are interchangeable or reversible in their position in the train and being of different diameter will when reversed transmit different speeds to the member 18. The gear pair is also interchangeable with other gear pairs of different ratio which are also reversible in position in the train. The described mechanism constitutes a feed train connecting shaft 11 with the clutch teeth 18a and the gear pair consisting of gears 16 and 17 constitutes a rate changer in the feed train for driving the member 18 at any of a variety of feed rates in accordance with the gears used and their relative position in the train. The feed rate changer shown is of simplified form for which a variety of well known equivalent forms of rate changer may be substituted.

Fixed on the shaft 11 is a bevel gear 21 meshing with a bevel gear 22 rotatably supported in housing 10 and having an extension or sleeve 23 fixed therewith and provided on an end face thereof with clutch teeth 23a. The arrangement described constitutes a rapid traverse train whereby the clutch teeth 23a are actuated from shaft 11 at a relatively rapid rate as compared with the feed rate applied to the clutch teeth 18a.

A shaft 24 is rotatably supported at the one end in a bushing 25 in housing 10, and at the other end in a suitable bore in the member 18, as particularly shown in Fig. 4. Shaft 24 is axially aligned with and passes through a suitable axial bore in the sleeve 23 and rotatably supported on the shaft is a clutch member 26 having at opposite ends clutch teeth complementary to the clutch teeth 18a and 23a and adapted to engage with the one or the other when suitably shifted along the supporting shaft, whereby the member 26 will be driven at a feed or at a rapid traverse rate.

The machine table 6 is provided with a screw 28 (see Fig. 4) journaled in the table but fixed for axial movement therewith and in threaded engagement with a nut 29 fixed in saddle 5 whereby table 6 will be reciprocated as screw 28 is moved in first one and then the other direction. The means whereby this is accomplished when the table 6 is to be driven from the joint shaft 2a includes oppositely rotating bevel gears 30 and 31 having an interlying clutch member (not shown) slidably splined with the screw 28, but in the operation of the machine in accordance with my invention the clutch member referred to is centrally positioned to be ineffective and therefore is not shown. Instead the screw 28 is provided with a removable gear 32 which is driven from the gear 27 by the means of an idler gear 33 rotatably supported by stud 33a. The feed clutch teeth 18a rotate in a direction opposite to rapid traverse clutch teeth 23a and the arrangement is such that when clutch member 26 engages with the feed clutch teeth the table 6 will move to the left in Fig. 2 or forward at a slow or feed rate, and when engaged with the rapid traverse clutch teeth table 6 will move rapidly to the right this being the reverse or backward direction.

For shifting the clutch member 26 the following mechanism is provided. A lever 34 (see Fig. 6) is fixed on a pivot pin 35 journaled in a sleeve or bushing 36 fixed in housing 10 and is provided with a hand grip 34a. A lever 37 pivoted on the projecting ends of sleeve 36 carries a pin 38 projecting at the one end into an annular groove or spool 39 in the member 26, and at the other end into a lost motion slot 34c in the end 34b of lever 34. End 34b has a cam formation 34d cooperating with a spring pressed plunger 40 whereby lever 34 is urged in the one or the other direction immediately the point of cam 34d passes the point of plunger 40 during the lever movement. A rod 41 (see Figs. 2 and 5) is slidable in supporting brackets 42 removably fixed at the front of the table 6 and is provided with slots 41a engaging with suitably formed lugs 34e on lever 34. Adjustably fixed on rod 41 are a plurality of trip dogs 43 respectively adapted to engage or strike a relatively fixed trip member 44 during table movement in opposite directions. When this occurs rod 41 will be shifted in the one or the other direction and will shift lever 34 sufficiently to cause the point of cam 34d to move past the point of plunger 40 following which the spring pressed plunger will quickly shift the lever through the remainder of its movement. Owing to the lost motion slot 34c the lever 34 in either direction of movement will move a certain distance before pin 38 and clutch member 26 is moved, sufficient that the point of cam 34d moves past the point of plunger 40 before the clutch member disengages from the clutch teeth 18a or 23a. The spring plunger is then urging opposite clutch engagement, and immediately the clutch member is fully disengaged from the one position it is shifted by the plunger and cam into opposite engagement, thus reversing the table movement.

By the means of the above described mechanism the table 6 together with table 7 may be caused to reciprocate continuously through a space or travel adjustable by the means of dogs 43 both for extent of movement and for position of reversal.

For the indexing or rotary movement of table 7 the following mechanism is provided. An extended hub portion of bevel gear 22 is provided with clutch teeth 44 with which complementary clutch teeth 45a on a shiftable clutch member 45 are adapted for engagement when member 45 is suitably shifted. Member 45 is slidably keyed with the shaft 24 and fixed upon or integral with the shaft is a bevel pinion 46 engaging a bevel gear 47 fixed with table 7. The clutch member 45 is urged in a direction to engage the clutch teeth 44 by a spring 48 but is normally restrained from engagement by the end 49a of a plunger 49 which is pressed by a spring 49b in a direction to engage with a cam groove 50 in the member 45, shown in developed form in Fig. 9, the cam groove being of such form that the plunger end may engage with the groove at some point of revolution of the clutch member and after engagement takes place the continued revolution of the clutch member will cause a high point 50a of the groove to react against the plunger end and withdraw the clutch member from engagement, thus disconnecting the drive to the table 7. Withdrawing plunger end 49a from the groove against the resistance of spring 49b permits spring 48 to immediately engage the clutch member 45 to drive table 7, but unless prevented the plunger end would engage the cam groove again as soon as the high portion 50a had moved past it, and would then disengage the clutch member after a single revolution. It is ordinarily desirable that the table 7 when moved should travel more than the amount corresponding to one revolution of clutch member 45 and to prevent clutch disengagement until the table has moved the distance desired, the following mechanism is provided. Lever 51 (see Figs. 3 and 5) is pivoted on a pin 52 and has an arm 51a with segment teeth 51b engaging suitable rack teeth in the plunger 49. Another arm 51c is provided with a portion 51d adapted to engage with the notches 52a of an index plate 52 removably fixed with a worm wheel 53 (see Fig. 7) which is journaled on a stud 54 and driven from the clutch member 45 to be rotated whenever the clutch member is rotated by the means of a gear 56 fixed on the clutch member, a gear 57 engaging therewith and a worm 58 engaging with worm wheel 53 and fixed for rotation with or integral with gear 57. When the plunger 49 is engaged the portion 51d is entered in one of the notches 52a but when the plunger is disengaged to permit clutch member 45 to engage the index plate 52 starts to move immediately the clutch member engages thus moving the notch 52a out of alignment with the portion 51d and the plunger cannot engage the cam groove again until the index plate has moved sufficiently to permit the portion 51d to align with another notch into which it can move, the portion meanwhile being forced by spring 49b against the periphery of the index plate which is of such diameter as to prevent engagement of the plunger end and cam groove.

The spacing of the notches 52a is calculated with reference to the ratio of the train connecting index plate 52 with table 7 consisting of bevel gears 47 and 46, shaft 24, spur gears 45 and 57, worm 58 and worm wheel 53 so that a predetermined desired portion of a revolution of table 7 will take place before clutch member 45 is withdrawn. The index plate 52 is removable and a variety of other index plates are provided to interchange therewith on the worm wheel 53 whereby a variety of indexing movements of table 7 may be had as desired.

It is desirable that the indexing or rotary movement of table 7 should start immediately upon the start of the left hand or feed movement and means are provided to cause the engagement of clutch member 45 whenever the clutch member 26 is shifted in a direction to cause a feed. The lever 51 has an arm 51e to which is pivoted a member 60 (see Figs. 3 and 5) by the means of a pivot pin 61. A lever 62 is fixed on rod 35 for movement with lever 34 and a portion 62a of lever 62 contacts with a portion 60a of member 60 when lever 34 starts to move in a direction of feed engagement, the parts then being in the position shown in Fig. 3. The member 60 is then moved from the lever 34 in a direction to cause the mechanism described to disengage the end 49a of plunger 49 from the cam groove and start the indexing. The portions 60a and 62a are yieldingly held in engagement by a spring 63 reacting against a pin 64 fixed in member 60 and a pin 64a fixed in an arm 62b of lever 62. The continued movement of the parts causes an adjustable screw 65 carried by arm 62b of lever 62, to contact a lug portion 60b of the member 60 and to force the portion 60a out of engagement with portion 62a. This occurs almost immediately after the clutch member 45 engages and leaves plunger 49 free to drop back into the cam groove as soon as it is permitted by the previously described movement of the index plate, that is to say as soon as the table indexing is finished. The portions 60a and 62a are provided with beveled edges as more particularly shown in Fig. 3 such that during the opposite movement of the lever 34 when the rapid return is begun, the portion 62a will move past the portion 60a, moving the member 60 against the resistance of spring 63 but without affecting the plunger 49, and at or near the completion of such reverse lever movement the high points of the portions have moved past one another so that the spring 63 again draws the parts into the position shown in Fig. 3 in readiness to set up the next indexing movement at the beginning of the next forward stroke. The spring 63 is relatively weak, and spring 40a for plunger 40 is relatively strong, whereby spring 40a readily overcomes spring 63 during the shift from forward to rapid return.

The mechanism described is sufficient to move table 7 the required index distance, but to locate the table in exact position at the completion of the index movement a series of equally spaced index notches 66 are provided, being in this instance cut in the body portion of bevel gear 47 fixed on table 7. An index plunger is adapted to engage with the notches 66, being urged in the direction of engagement by a spring 68. To withdraw the index plunger 67 before the start of the indexing movement the lever arm 51e is provided with a portion 69 engaging a suitable shoulder 70 on plunger 67 whereby as the lever 51 moves to cause engagement of clutch member 45 the plunger 67 is withdrawn and is retained in the withdrawn position until the portion 51a enters a notch 52a in plate 52 to stop the index movement whereupon the index plunger is free to enter whichever of the notches 66 that has been brought into alignment with it by the indexing movement. The number and spacing of notches 66 is calculated to provide for each of the various indexing movements required so that in any of the various desirable indexing movements a notch 66 will be provided. By the use of suitable index plates 52 it is possible to index any fractional part of a revolution of table 7 whose denominator is a factor of the number of equally spaced notches 66. In the present instance, there are twenty-four equally spaced notches, and table 7 may be indexed 1, ½, ⅓, ¼, ⅙, ⅛, 1/12 or 1/24 revolution according to the spacing of the notches 52a in index plate 52, the different indexing movements being desirable according to the nature and dimensions of the work pieces.

Having now explained the various mechanism in detail I will describe an illustrative mode of operation as follows. Referring to Fig. 2, a cutter A of the well known face mill type is fixed on spindle 3, and a work piece B is fixed on table 7. The work piece B is traveling to the left at a feed rate. When the cutter reaches the position A1 relative to the work piece the right hand table dog will operate as previously described to reverse the movement and start the work to the right at a rapid rate. During the operation of the cutter on work piece A, the operator will remove a previously finished work piece C and replace it with an unfinished work piece. At the completion of the right hand movement the left hand dog operates as previously described to reverse the movement and start work to the left again at a feed rate, also starting the index movement. The work pieces being in this instance spaced at 180 degrees, the indexing movement here required is one half revolution of table 7 but the index movement is comparatively rapid and before the new work piece contacts with cutter A the indexing is completed. The above cycle of movement is repeated indefinitely.

Various modified but equivalent constructions may be made in the light of the above disclosure, each of which are within the spirit and scope of the invention clearly pointed out in the following claims.

I claim:

1. The combination with a reciprocatory support and a rotary indexable table mounted thereon, of a power transmission connectible for table rotation at intervals and including an element shiftable in opposite directions to establish or to interrupt the transmission connection, a train connectible to reciprocate said support in a direction transverse to the axis of table rotation, power operated means for shifting said element in one of said directions including a member having notches spaced to determine the amount of table rotation during a given index movement, and means for shifting said element in the other direction including a part movable in accordance with the reciprocation of said support.

2. The combination of a rotatably indexable table, a support therefor and reciprocable in a direction transverse to the axis of table rotation, means for locating said table in various positions of rotational movement including a series of equally spaced notches and a plunger adapted to engage therewith, a power train for rotating said table at intervals corresponding to the reciprocatory movement of said support, and an index plate movable from said train and operative to prevent engagement of said plunger with certain of said notches while permitting plunger engagement with other of said notches.

3. In a mechanism of the nature disclosed, the combination of a machine tool including a reciprocable table, a base removably attached thereto, a table rotatably journaled in said base with its axis of rotation transverse to the direction of reciprocation of the first named table, a first power train supported from said base and connectible for the reciprocation of the first named table, a second power train supported from said base and connectible for the rotation of the other table, means for locating said rotatable table in various positions of rotation including a member fixed for rotation with the rotatable table and having a series of equally spaced notches and a plunger engageable therewith, and an index plate supported from said base and movable from said second power train and operative to prevent engagement of said plunger with certain of said notches while permitting plunger engagement with other of said notches.

4. In a milling machine the combination of a reciprocatory support, a table supported therefrom for rotation on an axis at right angles to the plane of support movement, said table being adapted for a plurality of work pieces to be fixed thereon on opposite sides of the axis thereof, a cutter spindle adjacent said table, a first train including in the order recited a drive member, a clutch and means for rotating said table at intervals to alternately move the one or the other work piece to a position adjacent said spindle, a plurality of branch lines connected with said train at a point between said member and clutch, one of said branch lines including rate change means, a second train alternatively connectible with said branch lines and including means for reciprocating said support, and control means for shifting said clutch in accordance with the alternative connection of said second train.

5. In a milling machine, the combination of a reciprocatory support, a base structure removably fixed thereon, a table supported on said structure for rotation on an axis at right angles to the plane of movement of said support and for supporting a plurality of work pieces respectively on opposite sides of the table axis, a tool spindle adjacent said table and rotatable on an axis parallel with the table axis, a train supported from said structure and power operable for rotation of said table, transmission mechanism for said reciprocatory support including a shiftable reverser, and control means for operation of said table train in accordance with the movement of said reverser.

6. The combination of a reciprocatory support, a table rotatably mounted thereon, there being a series of locating notches associated with said table, a plunger adapted to engage with any of said notches, a power train engageable for table rotation, control means for engaging said train for said rotation of said table and simultaneously disengaging said plunger in accordance with the reciprocation of said support, and means for disengaging said train to determine the rotation of said table, the last mentioned means comprising control means simultaneously determining the amount of table rotation and preventing said plunger from entering certain of said notches in accordance therewith.

7. The combination of a reciprocatory support, a table rotatably mounted thereon, there being a series of locating notches associated with said table, a plunger adapted to engage said notches, a first train comprising a drive member, a clutch and table rotating means in the order stated, a second train originating at a point between said member and said clutch and including means to reciprocate said support, a power trip operative from said second train for simultaneously engaging said clutch and disengaging said plunger, and a power trip operable from said first train for simultaneously disengaging said clutch and engaging said plunger, said power trip including means simultaneously determining the amount of table rotation and preventing said plunger from engaging certain of said notches in accordance therewith.

8. In a milling machine the combination of a rotatable tool spindle, a work support reciprocably movable in a path transverse to the axis of said spindle, a work table rotatably indexable on said reciprocable support, a power transmission for movement of said support, a power train selectively operable for index movement of said table through any of a variety of fractional revolutions, and including an element shiftable to engage and to disengage said train, means operative in accordance with the reciprocatory movement of said support to shift said element to engage said train whereby to start said index movement, and means predeterminative of one of said variety of fractional revolutions and operative to shift said element to disengage said train.

9. In a milling machine the combination of a rotatable tool spindle, a work support reciprocably movable in a path transverse to the axis of said spindle, a work table rotatably indexable on said reciprocable support, an index plate fixed with said table, a movable index plunger adapted to engage said plate in any of a variety of positions of fractional revolutions of said table, a power transmission for movement of said support, a power train selectively operable for index movement of said table through any of said variety of fractional revolutions and including a clutch shiftable to engage and to disengage said train, means operative in accordance with the reciprocatory movement of said support to engage said clutch and simultaneously move said plunger to disengage said plate, and means predeterminative of one of said variety of fractional revolutions and operable for simultaneously disengaging said clutch and engaging said plunger with said plate.

10. In a milling machine, the combination of a rotatable tool spindle, a reciprocable table supported adjacent said spindle for movement in a path transverse to the spindle axis and adapted to directly support work pieces, a base removably attached to said reciprocable table, an indexable table carried by said base for rotary index movement about an axis transverse to the direction of movement of said reciprocable table, said indexable table being adapted to directly support a plurality of work pieces respectively on opposite sides of the axis thereof, a power train carried by said base including a portion operable to establish or to interrupt index movement of said indexable table and including a drive member journaled in said base and having an exposed coupling, a trip device carried by said base and shiftable to control the operation of said power train, said trip device including an element exposed for operation in accordance with the movement of said reciprocatory table, said base, indexable table, power train and trip device being portions of an attachment unitarily removable from said reciprocatory table, whereby work pieces may replace said attachment on said reciprocable table whenever indexing movement of the work pieces is not required.

11. In a milling machine, the combination of a rotatable tool spindle, a reciprocatory table supported for horizontal movement, a base removably fixed on said reciprocatory table, an indexable table carried by said base for rotary index movement about an axis transverse to the direction of reciprocatory table movement, power operable transmission mechanism including means for movement of said reciprocatory table, means for indexing said indexable table, and a coupling portion adapted to interconnect the one of said means with the other for effecting a predetermined indexing movement during a predetermined reciprocatory movement, and control mechanism for said transmission mechanism including a device carried by said base and determinative of the amount of said indexing movement, and a power trip for engaging said indexing movement at a predetermined point in said reciprocatory movement, said base, indexable table and device being portions of an attachment unitarily removable from said reciprocatory table, and said coupling portion including means adapted to be uncoupled for effecting said unitary removal.

12. In a milling machine, the combination of a work table movable in a horizontal reciprocatory path, a base removably fixed on said table, an indexable table carried by said base for rotary index movements about an axis transverse to said path, a tool spindle rotatable on an axis parallel with the axis of said indexable table, power operable transmission mechanism including means for movement of said reciprocatory table and providing an element underneath said table, means for indexing said indexable table through a half revolution thereof and a coupling portion extending between the last mentioned means and said element and determinative of a predetermined reciprocatory movement during said indexing movement, and control mechanism for said transmission including a device determinative of said half revolution of indexing movement and a power trip for initially engaging said indexing means at a predetermined point in said reciprocatory movement, said base, indexable table and device being portions of an attachment unitarily removable from said reciprocatory table and said coupling portion including means adapted to be uncoupled for effecting said unitary removal.

JOSEPH B. ARMITAGE.